(12) United States Patent
Perraud (10) Patent No.: US 12,342,239 B2
(45) Date of Patent: Jun. 24, 2025

(54) METHOD FOR SUBSCRIBING TO A GEO-SERVICE IN A MEC ARCHITECTURE

(71) Applicant: Nissan Motor Co., Ltd., Kanagawa (JP)

(72) Inventor: Eric Perraud, Plaisance-du-Touch (FR)

(73) Assignee: Nissan Motor Co., Ltd., Kanagawa (JP)

( * ) Notice: Subject to any disclaimer, the term of this patent is extended or adjusted under 35 U.S.C. 154(b) by 773 days.

(21) Appl. No.: 17/597,871

(22) PCT Filed: Jul. 8, 2020

(86) PCT No.: PCT/EP2020/069197
§ 371 (c)(1),
(2) Date: Jan. 27, 2022

(87) PCT Pub. No.: WO2021/018529
PCT Pub. Date: Feb. 4, 2021

(65) Prior Publication Data
US 2022/0256306 A1    Aug. 11, 2022

(30) Foreign Application Priority Data
Jul. 31, 2019  (FR) ........................................ 1908741

(51) Int. Cl.
| *H04W 4/021* | (2018.01) |
| *G08G 1/0967* | (2006.01) |
| *H04W 4/44* | (2018.01) |
| *H04W 8/18* | (2009.01) |
| *H04W 60/00* | (2009.01) |

(52) U.S. Cl.
CPC ...... *H04W 4/021* (2013.01); *G08G 1/096716* (2013.01); *G08G 1/096775* (2013.01);
(Continued)

(58) Field of Classification Search
CPC ......... H04W 4/021; H04W 4/44; H04W 8/18; H04W 60/00; H04W 4/40; H04W 72/512;
(Continued)

(56) References Cited

U.S. PATENT DOCUMENTS

| 2003/0088695 A1 | 5/2003 | Kwak et al. |
| 2004/0128344 A1 | 7/2004 | Trossen |

(Continued)

FOREIGN PATENT DOCUMENTS

| EP | 3282718 A1 | 2/2018 |
| JP | 2008096449 A | 4/2008 |

(Continued)

*Primary Examiner* — Marcus Hammonds
(74) *Attorney, Agent, or Firm* — Osha Bergman Watanabe & Burton LLP (57) ABSTRACT

The disclosure concerns a method for subscribing a mobile device to information on events from a geo-service hosted on a peripheral server for processing data in an MEC architecture network. The method includes the steps of: sending a registration message to a central server; sending a subscription message, to a type of event, to the peripheral server; receiving a message giving information on an event of the type, the registration message indicating the event type, and sending of the subscription message being subject to the prior reception of a notification message that an event of the type has occurred and that the corresponding information is suitable to be communicated by the peripheral server.

10 Claims, 4 Drawing Sheets

(52) U.S. Cl.
CPC ............... *H04W 4/44* (2018.02); *H04W 8/18* (2013.01); *H04W 60/00* (2013.01)

(58) Field of Classification Search
CPC ............ H04W 76/10; G08G 1/096716; G08G 1/096775; G08G 1/096741; H04L 67/55; H04L 67/12; H04L 67/52; H04L 67/141; H04L 67/148; H04L 63/08
See application file for complete search history.

(56) References Cited

U.S. PATENT DOCUMENTS

| | | | |
|---|---|---|---|
| 2009/0176511 A1* | 7/2009 | Morrison | H04W 4/029 455/456.3 |
| 2009/0248828 A1* | 10/2009 | Gould | G08B 27/005 705/1.1 |
| 2010/0329213 A1 | 12/2010 | Hayashi | |
| 2012/0135752 A1 | 5/2012 | Hayashi | |
| 2016/0100358 A1 | 4/2016 | Hayashi | |
| 2017/0201896 A1 | 7/2017 | Hayashi | |
| 2018/0199216 A1 | 7/2018 | Hayashi | |
| 2018/0349203 A1 | 12/2018 | Ohta et al. | |
| 2019/0174334 A1 | 6/2019 | Hayashi | |
| 2020/0045566 A1 | 2/2020 | Hayashi | |

FOREIGN PATENT DOCUMENTS

| | | | |
|---|---|---|---|
| JP | 2016184853 A | 10/2016 | |
| JP | 2017163577 A | 9/2017 | |
| WO | 2017094246 A1 | 6/2017 | |
| WO | 2018/093380 A1 | 5/2018 | |

\* cited by examiner

METHOD FOR SUBSCRIBING TO A GEO-SERVICE IN A MEC ARCHITECTURE

TECHNICAL FIELD

The present invention relates generally to the field of telecommunications and relates more specifically to a method for subscribing a mobile equipment to information specific to a geographic location, in an MEC (abbreviation for "Mobile Edge Computing") architecture.

BACKGROUND ART

The MEC architecture as defined in the specification ETSI GS MEC 003 ("European Telecommunications Standards Institute Group Specification Mobile Edge Computing") makes it possible to relocate certain computations performed in a mobile terminal to distributed servers, located in a restricted geographic zone around the position of the mobile terminal and/or centralized in the MEC architecture. That makes it possible, notably for mobile devices embedded in a connected vehicle, to profit from a very great computation power available in these servers, notably to display a high-definition mapping of the road, enriched with events in real time and which can be shared between connected vehicles. A complementary service hosted in these servers is a service for determining a virtual horizon, also called electronic horizon, informing the vehicle of objects or of events occurring in the near future but that cannot immediately be accessed by the sensors embedded in the vehicle. These mapping or electronic horizon services are geo-services in as much as the data that they process depend on a geographic location.

Figure 1:
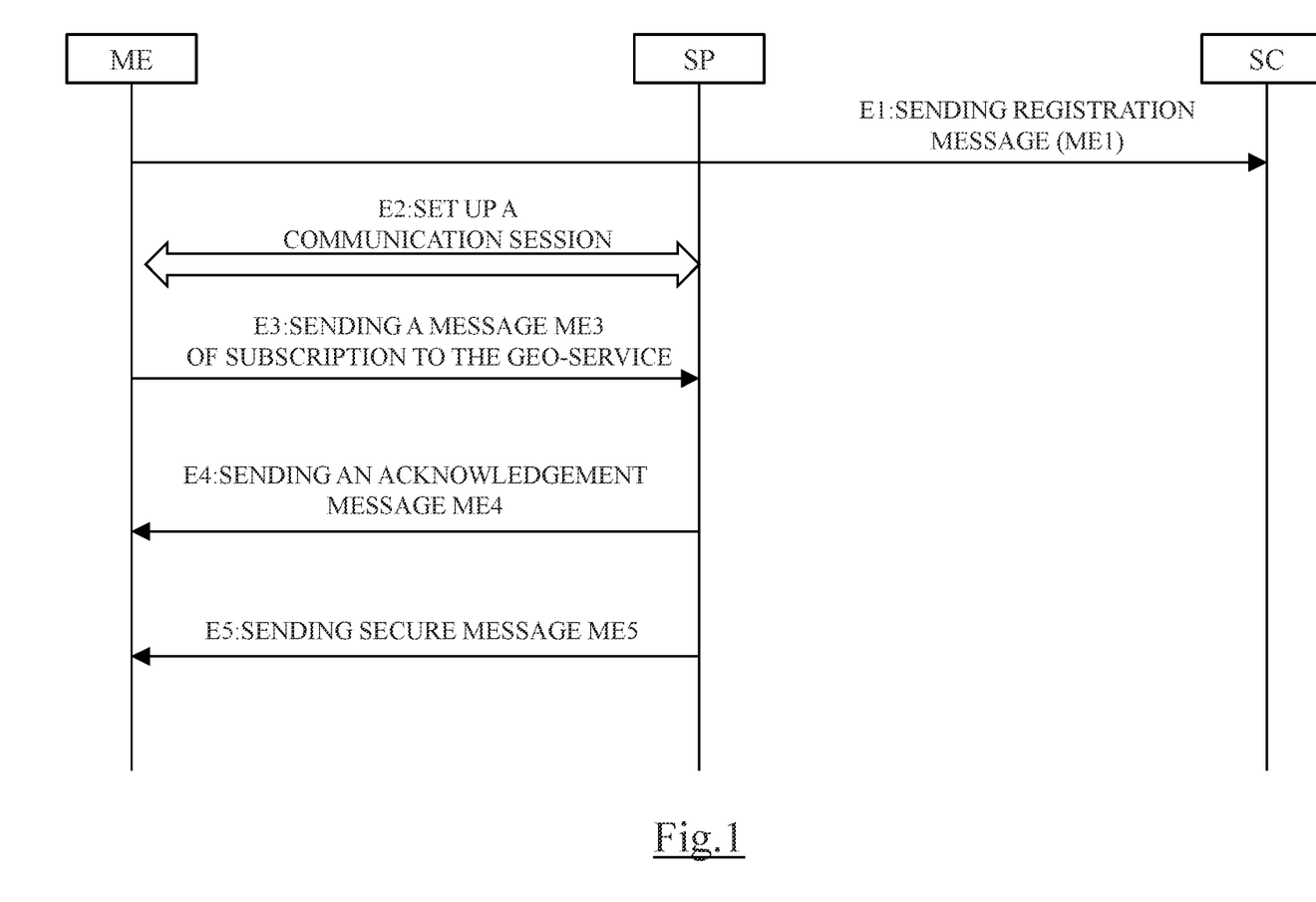
FIG. 1, described in relation to the prior art, represents a procedure for subscribing a mobile equipment to events with a geo-service according to the prior art.

A mobile equipment ME of a vehicle that wants to benefit from such a service must first of all be identified and registered with a central server SC of an MEC architecture network, in a first step E1 corresponding to the sending of a registration message ME1, represented in FIG. 1. On reception of this message ME1, the central server SC authenticates the mobile equipment ME. The latter being authenticated, the central server SC verifies that the mobile equipment ME has the rights needed to use the requested geo-service then authorizes it to use it.

In a second step E2, the mobile equipment ME sets up a communication session with a data processing peripheral server SP which instantiates this geo-service for a geographic zone in which the mobile equipment ME is located.

Once the communication session is set up, the mobile equipment ME sends, in a step E3, a message ME3 of subscription to the geo-service, to the peripheral server SP. This message ME3 comprises a list of events likely to be of interest to it in a region of interest ROI that it also indicates in this message ME3. The list of events comprises, for example, a value corresponding to road accidents, and another value corresponding to traffic jams. The message ME3 can be a request of secure http type.

The next step E4 is the sending by the peripheral server SP to the mobile equipment ME of an acknowledgement message ME4, here a secure acknowledgement http message.

When an event corresponding to the list sent in the step E3 by the mobile equipment ME occurs, the peripheral server SP sends a secure message ME5, to inform the mobile equipment ME thereof, in a step E5.

SUMMARY OF INVENTION

Problems to be Solved by Invention

This procedure allowing a mobile equipment to subscribe to a geo-service induces a costly communication between the mobile equipment and the peripheral server. In fact, the step E2 of https (short for hypertext transfer protocol secure) connection including the opening of a communication session and a TLS (short for transport layer security) negotiation comprises the exchange of approximately 20 messages. These communications in addition use uRLLC (short for ultra-reliable and low latency connection) slices with high quality of service to handle a real time notification of the mobile equipment. These are therefore communications that are relatively expensive and voluminous in terms of data for the mobile equipment and for the MEC architecture network whose uRLLC resources are limited, just like the computation resources in the peripheral servers of the network. In addition, the time used on a peripheral server to launch an execution of a geo-service is costly.

There is therefore a need, for a mobile equipment, to limit the usage of the uRLLC resources and the connections on a peripheral server, when it is a user of a geo-service in an MEC architecture network.

One of the aims of the invention is to remedy at least some of the drawbacks of the prior art by providing a method for subscribing a mobile equipment to a geo-service, and a method for sending a mobile equipment information linked to a geo-service, which limits the mobile equipment subscription procedures to the cases where the peripheral servers instantiating this geo-service actually have information to be supplied to the mobile equipment.

Means for Solving Problems

To this end, the invention proposes a method for subscribing a mobile equipment to information on events of at least one type with a notification service linked to the geography of a location, said notification service being hosted in a data processing peripheral server in an MEC architecture network, said method being implemented in said mobile equipment and comprising steps of:
  sending of a message requesting registration with a central server of said network,
  sending of a message for subscription, intended for said data processing peripheral server, to said at least one type of event,
  reception of a message giving information to said mobile equipment on an event of said at least one type,
said method being characterized in that said registration request message indicates said at least one type of event and in that the step of sending of a subscription message is conditioned on the existence of a preceding step of reception of a notification message that an event of said at least one type has occurred in said location, corresponding information being able to be communicated by said peripheral server, said notification message being delivered to said mobile equipment over a fast messaging channel called "paging" channel.

By virtue of the invention, the mobile equipment triggers the procedure for subscription with the data processing peripheral server only if the latter actually has information to be supplied to the mobile equipment, that is to say information which corresponds to less one of the types of events for which the mobile equipment has previously registered with the central server. Thus, the unnecessary sending of messages corresponding to the subscription procedure is avoided, there is a saving on the uRLLC resources and of the core network of the MEC architecture, and the electrical consumption of the vehicle is reduced.

According to an advantageous feature of the subscription method according to the invention, said mobile equipment indicates in said subscription message a region of interest for which said peripheral server must send it said information on said events of at least one type.

Thus, even when the vehicle subscribes with the peripheral server to certain types of events, there is a saving on the sending of information that does not correspond to the geographic zone that is genuinely of interest for the mobile equipment.

Typically, said mobile equipment is a communication module of a motor vehicle and said region of interest corresponds to a programmed path of said vehicle. This example of use of the invention offers a particular benefit because the region of interest can be processed dynamically, the central server and the peripheral servers being, for example, coupled to a location service of the vehicle to track the position thereof and dynamically restrict the broadcasting zone of the notification messages.

According to another advantageous feature of the subscription method according to the invention, the step of reception of a notification message comprises a substep of decoding of a data field specific to such an event notification, said specific data field being included in a data field assigned to the core network and present in the "paging record" field of said fast messaging channel.

This specific data field is, for example, assigned to all the V2X (short for vehicle-to-everything) services which makes it possible to specify a list of types of events to which the vehicles can subscribe.

The invention relates also to a method for sending a mobile equipment information on an event of a type by a data processing peripheral server hosting a notification service linked to the geography of a location in an MEC architecture network, said method being implemented in said network and comprising steps of:
  reception by a central server of a registration request message sent by said mobile equipment, said message comprising an indication of at least said type of event,
  sending by said central server of a message indicating at least said type of event to at least one data processing peripheral server of said network hosting said notification service,
  verification by said at least one peripheral server of the presence of events of said type in its database,
  when said at least one peripheral server includes an event of said type in its database, sending by said at least one peripheral server of a message to at least one base station to which it is attached for broadcasting, on a fast messaging channel, of a message notifying the presence of said type of event, to said mobile equipment,
  reception by said at least one peripheral server of a message of subscription to said type of event, sent by said mobile equipment,
  sending by said at least one peripheral server of a message to said mobile equipment, giving information on said event.

Advantageously, said subscription message comprises a region of interest, and said step of sending of a message giving information is conditioned on the fact that said event relates to said region of interest.

Also advantageously, in the step of sending by said central server of a message indicating at least said type of event, said message indicating at least said type of event is sent only to the data processing peripheral servers of said network hosting said notification service for which the network coverage corresponds to the current or programmed position of said mobile equipment.

Also advantageously, said at least one peripheral server sends a message only to the base stations corresponding to the current or programmed position of said mobile equipment, for broadcasting, on a fast messaging channel, of said message notifying the presence of said event to said mobile equipment.

Also advantageously, said at least one peripheral server sends said message to said at least one base station only if said event is associated with the zone covered by said at least one base station.

Also advantageously, the step of sending by said at least one peripheral server of a message giving information to said mobile equipment is followed by a step of sending of a message by said at least one peripheral server to said less one base station to which it is attached to stop the broadcasting on said fast messaging channel of said notification message when said event becomes obsolete or when said mobile equipment leaves the zone served by said at least one data processing peripheral server.

The method for sending a mobile equipment information on an event of a type by a data processing peripheral server according to the invention offers advantages similar to those of the subscription method according to the invention.

BRIEF DESCRIPTION OF DRAWINGS

Other features and advantages will become apparent on reading of a preferred embodiment described with reference to the figures in which.

MODE(S) FOR CARRYING OUT THE INVENTION

Figure 2:
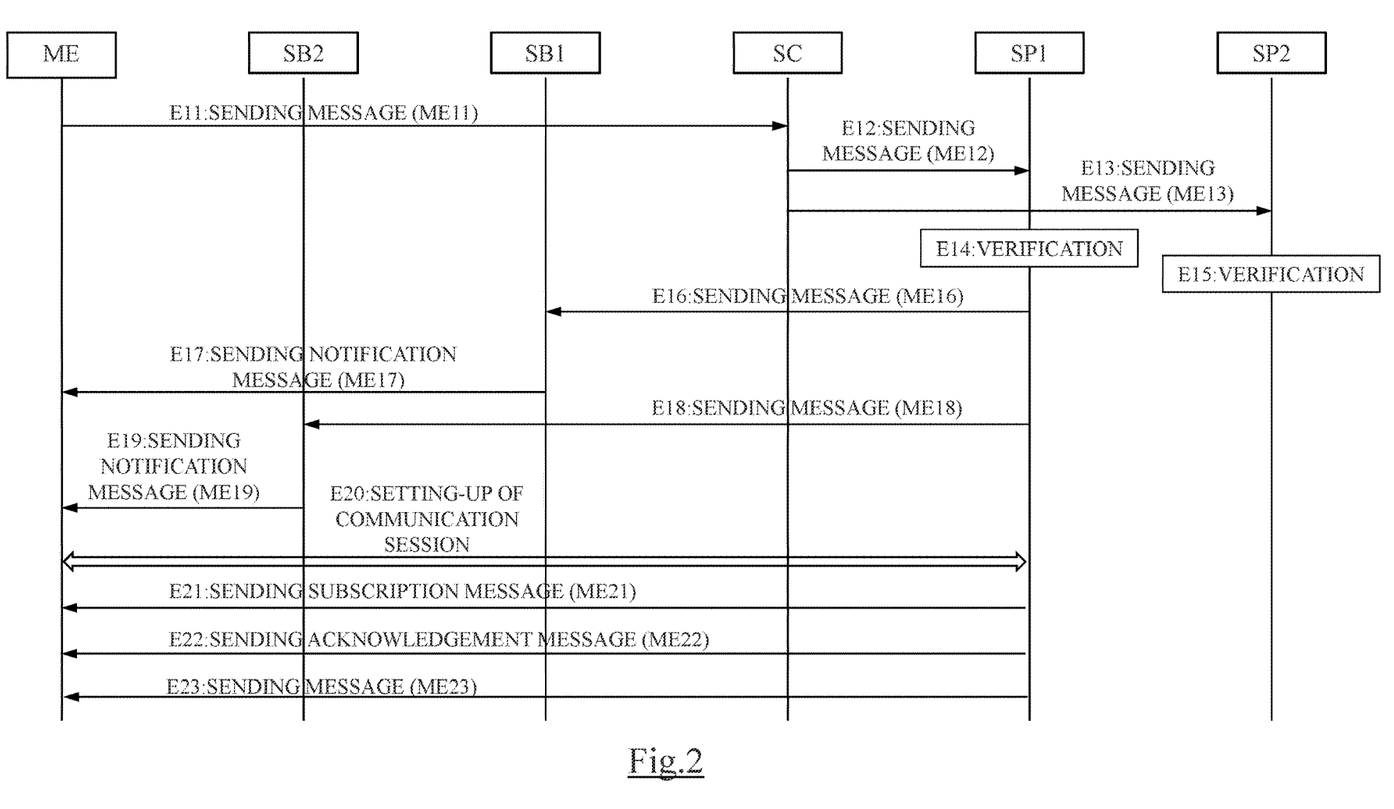
FIG. 2 represents a procedure for subscribing a mobile equipment to events with a geo-service according to the invention, and a method for sending this mobile equipment information on these events according to the invention, in this preferred embodiment of the invention.

According to a preferred embodiment of the invention, a mobile equipment ME subscribed to an information notification service linked to the geography of a location, called geo-service, by the procedure represented in FIG. 2.

In a first step E11, the mobile equipment ME, here embedded in a vehicle, sends a message ME11 for registration to a central server SC of an MEC architecture network. This message ME11 comprises an identifier of the mobile equipment ME, values of parameters allowing the processing and communication capacities of the vehicle to be assessed, an identifier of the geo-service to which the mobile equipment ME is registered, and one or more values corresponding to types of events for which the mobile equipment is asking to be notified. These events correspond, for example, to works, accidents, slow vehicles or traffic jams. The message ME11 is based for example on the https protocol.

On reception of this message ME11, the central server SC authenticates the mobile equipment ME, then checks that the mobile equipment ME has the necessary capacities to use the requested geo-service, and authorizes it to use it with the data processing peripheral servers instantiating this geo-service. The central server SC sends in particular, after the step E11, a message ME12 to a first peripheral server SP1 in a step E12 and a message ME13 to a second peripheral server SP2 in a step E13. These servers correspond to the peripheral servers instantiating the geo-service and whose operator allows access to the mobile equipment ME notably according to the subscription thereof. The messages ME12 and ME13 are based for example on the https or mqtt (short for message queuing telemetry transport) protocols on a secure layer. As a variant, if the central server SC is interfaced with a location service of the mobile equipment ME, the central server SC sends messages, immediately after the first step E11, only to the data processing peripheral server corresponding to a rough location of the vehicle. Thus, the vehicle will benefit from the geo-service even if it is moving around in a zone of predefined distance.

The messages ME12 and ME13 each comprise an identifier of the mobile equipment ME and a list of values corresponding to types of event for which it is asking to be notified. This mobile equipment identifier derives from the IMEI (short for international mobile equipment identity) according to the cellular network standards. The steps E12 and E13 are each followed respectively by the steps E14 and E15 which are, for example, performed simultaneously.

The step E14 is the verification, by the peripheral SP1, that one or more events of the type included in the list received in the step E12 are stored in its database. In this exemplary embodiment of the invention, it is assumed that at least one of these events is stored in the database of the peripheral server SP1, for example an accident in the geographic zone covered by this peripheral server.

Likewise, the step E15 is the verification, by the peripheral server SP2, that one or more events of the type included in the list received in the step E13 are stored in its database. In this exemplary embodiment of the invention, it is assumed that no corresponding event is stored in the database of the peripheral server SP2. Because of this, the peripheral server SP2 stores the list received in the step E13 but does not initiate a notification procedure concerning the mobile equipment ME.

After the step E14, the peripheral server SP1 sends a message ME16 to a first base station SB1 in a step E16, and a message ME18 to a second base station SB2 in a step E18. These messages use, for example, the https protocol.

These base stations SB1 and SB2 correspond to the radio transmission and reception stations to which the peripheral server SP1 is attached. As a variant, if the peripheral server SP1 is interfaced with a location service of the mobile equipment ME, the peripheral server SP1 sends messages, immediately after the step E14, only to the base stations corresponding to a rough location of the vehicle, and/or to the base stations whose geographic coverage corresponds to the events stored in the database of the peripheral server SP1. Thus, the vehicle will benefit from the geo-service even if it is moving around in a zone of predefined distance and will be notified only of the events linked to this zone of predefined distance.

The messages ME16 and ME18 each comprise an identifier of the mobile equipment ME and one or more values corresponding to the types of events stored in the database of the peripheral server SP1 and included in the list received in the step E12, here a value corresponding to an accident.

On reception of the message ME16, the base station SB1 sends, in a step E17, a notification message ME17 to the mobile equipment ME. The sending of this notification message ME17 uses the fast messaging channel called "paging" channel. For that, the base station SB1 adds to the LTE (short for long term evolution) subfield called "paging occasion (PO)" corresponding to the identifier of the mobile equipment, a specific data field "V2X" in the data field called "paging record" of a list of data "paging record list" intended for the mobile equipment attached to the base station SB1.

The data field "paging record" then comprises the following data fields:

"UE-identity" which codes an identifier value of the mobile equipment ME,

"cn-domain" which takes the values "ps" for "packet-switched", "cs" for "circuit-switched" or "V2X" which is a new value used to notify the mobile equipment according to the invention, the chosen value "cn-domain" being that which corresponds to the message intended for the mobile equipment: incoming data communication, incoming voice communication or notification message according to the invention. In this exemplary embodiment of the invention, the "cn-domain" field therefore takes the value "V2X".

the specific data field "V2X" which codes, in this exemplary embodiment, the type of event corresponding to an accident. More generally, the content of this field is a table itemizing all of the events present in the database of the peripheral server associated with the base station concerned and for which the mobile equipment whose identifier is "UE-identity" is potentially interested (i.e. which form part of the registration message ME11. Thus, if, at the time of the registration message ME11, the vehicle indicated that it was interested in four types of events (accident, animal on the road, works, traffic jam), the peripheral server SP1 having in its database events of accident type only, the field "V2X" takes the value (accident).

The message ME17 corresponding to this specific data field "V2X" is notified periodically to the mobile equipment ME, which typically wakes up every 1.048 s (seconds) to read the "paging occasion" field. This period of 1.048 corresponds to a discontinuous reception cycle called DRX, and allows the mobile equipment ME not to continuously monopolize its radio resources in listening to the "paging" channel when it is in standby mode. On reception of the message ME17 in this step E17, the mobile equipment ME therefore decodes this specific field "V2X" of the message ME17 transmitted over the "paging" channel and sees that the geo-service has recorded an event of "accident" type likely to correspond to its region of interest ROI.

Likewise, on reception of the message ME18, the base station SB2 sends, in a step E19, a notification message ME19 to the mobile equipment ME. The sending of this notification message ME17 comprising the type of event corresponding to an accident and the identifier of the mobile equipment uses the "paging" channel in a way similar to the step E17.

It is assumed, in this exemplary embodiment of the invention, that the mobile equipment ME is located within the coverage of the base station SB1 and therefore receives the notification message ME17.

The next step E20 is then the setting-up of a communication session with the data processing peripheral server SP1, in order to recover information on the event of "accident" type of which it has just been notified. This step E20 proceeds in a way similar to the step E2.

The next step E21 is the sending by the mobile equipment ME of a subscription message ME21 subscribing to the event of "accident" type. This message ME21 comprises the identity of the mobile equipment and a value corresponding to the "accident" type of event, and a corresponding region of interest ROI, in this exemplary embodiment of the invention, corresponding to a programmed path of the vehicle.

It should be noted that this message ME21 does not include a value corresponding to a type of event other than "accident" since the mobile equipment knows, through the notification message ME17, that there are no events of other types stored in the database of the peripheral server SP1. Furthermore, the mobile equipment ME sends a subscription message only to the peripheral server SP1 because it is that which corresponds to its geographic position.

If, in the meantime, a new type of event occurred in the database of the server SP1 (an animal on the road being detected for example), the "V2X" field of the "paging record" of the mobile equipment interested in this type of event would be updated and the mobile equipment would be notified of this new type of event upon the next transmission of the fast messaging message, called paging message. A mobile equipment would then receive a notification on this channel with the "V2X" field set to {accident, animal on the road}. After having received this notification, it could then include this new type of event in its next subscription message to the server SP1.

On reception of the message ME21, the peripheral server SP1 sends an acknowledgement message ME22 to the mobile equipment ME, in a step E22. Then, the peripheral server SP1 checks whether the event that it has stored is located within the region of interest ROI of the vehicle. It is assumed in this exemplary embodiment that the accident concerned has occurred within the region of interest ROI of the vehicle.

The next step E23 is then the sending of a message ME23 by the peripheral server SP1 to the mobile equipment ME, comprising information linked to the accident, notably the position of the accident.

It should be noted that, based on the occurrences of events handled by the geo-service, more or less message exchanges are necessary in the MEC architecture network when using the invention. In particular:

in the case where the accident does not take place within the region of interest of the vehicle, the step E23 does not take place, the peripheral server not sending the corresponding information to the vehicle in this case.

in the case where another type of event takes place within the zone served by the peripheral server SP1, for example works, the messages ME17 and ME19 will include two values in the specific data field "V2X", corresponding to the "accident" and "works" types provided that the equipment has indicated, in the registration step E11, interest in at least the events of "accident" and "works" type.

in the case where another event of a type included in the list received in the step E13 takes place within the zone served by the peripheral server SP2, the latter sends messages to the base stations with which it is associated for them to notify, by the "paging" channel, the presence of this other event to the mobile equipment ME. The latter will receive this notification only when it enters into the coverage of one of these base stations.

It should be noted that, in this last case in which another event takes place within the zone served by the peripheral server SP2, the order of execution of the steps is different in the variant in which the central server SC sends a message including the events of interest for the mobile equipment only to the peripheral server SP1 serving the zone in which the vehicle is located. In fact, in this variant, it is necessary to wait for the vehicle to enter into the zone served by the peripheral server SP2 for the central server SC, notified of this movement by the location service, to send a message with the events of interest to the peripheral server SP2, which then sends messages to the base stations to which it is attached, these base stations then notifying the mobile equipment ME. If the peripheral server SP2 is also interfaced with the location service, it preferably sends a message only to the base station under which the mobile equipment ME is located, and possibly only if this other event is located within the zone covered by this base station, in order to save further on the network and radio resources.

Figure 3:
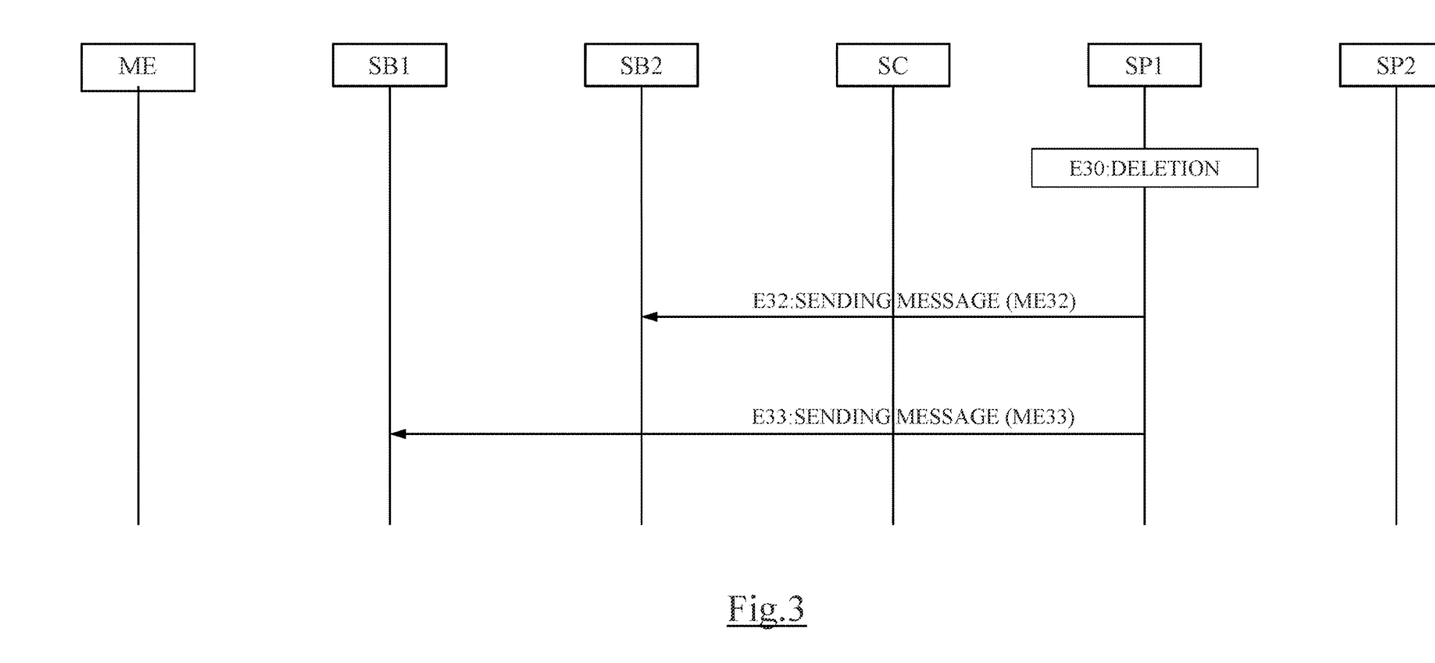
FIG. 3 represents steps of suspension of the sending of notification messages to the mobile equipment when the corresponding events have become obsolete, in this preferred embodiment of the invention.

Referring to FIG. 3, additional steps E30 to E33 are provided in the case where the peripheral server SP1 has no events stored in its database, for which the mobile equipment ME had asked to receive notifications. In this example of use of the invention, it is assumed, for example, that the vehicle involved in the accident corresponding to the event notified in the step E17 has been cleared from the road.

The step E30 is then the deletion, in the database of the peripheral server SP1, of the event corresponding to this accident.

The following steps E32 and E33 are the sending of messages ME32 and ME33 by the peripheral server SP1, respectively to the base station SB2 and to the base station SB1, asking them to stop inserting the "V2X" message corresponding to the "accident" type of event in the "paging" channel to the mobile equipment ME. The base stations SB2 and SB1 then release the radio and memory resources by erasing this notification request from their database. It should be noted that the peripheral server does not in any way erase its data linked to the mobile equipment ME for the geo-service as long as the mobile equipment does not unregister from this geo-service. Thus, if a new event of interest to the mobile equipment ME occurs, the peripheral server SP1 will be able to re-send messages similar to the messages ME16 and ME18 to its base stations of attachment.

In the variant in which the peripheral server SP1 is interfaced with a location service, the peripheral server SP1 sends messages asking to stop notification to the mobile equipment ME by the "paging" channel only to the base station under the coverage of which the mobile equipment ME is located.

The mobile equipment is notified of the disappearance of the accident by the absence of the "V2X" data field in the "paging" channel, in the next discontinuous reception cycle DRX. If, on the other hand, a next "V2X" data field transmitted by the "paging" channel includes a new type of event, included in the message ME11, for example corresponding to works, then the mobile equipment "ME" will be able to update its subscription request to receive the corresponding information by the sending of a new message similar to the message ME21.

Figure 4:
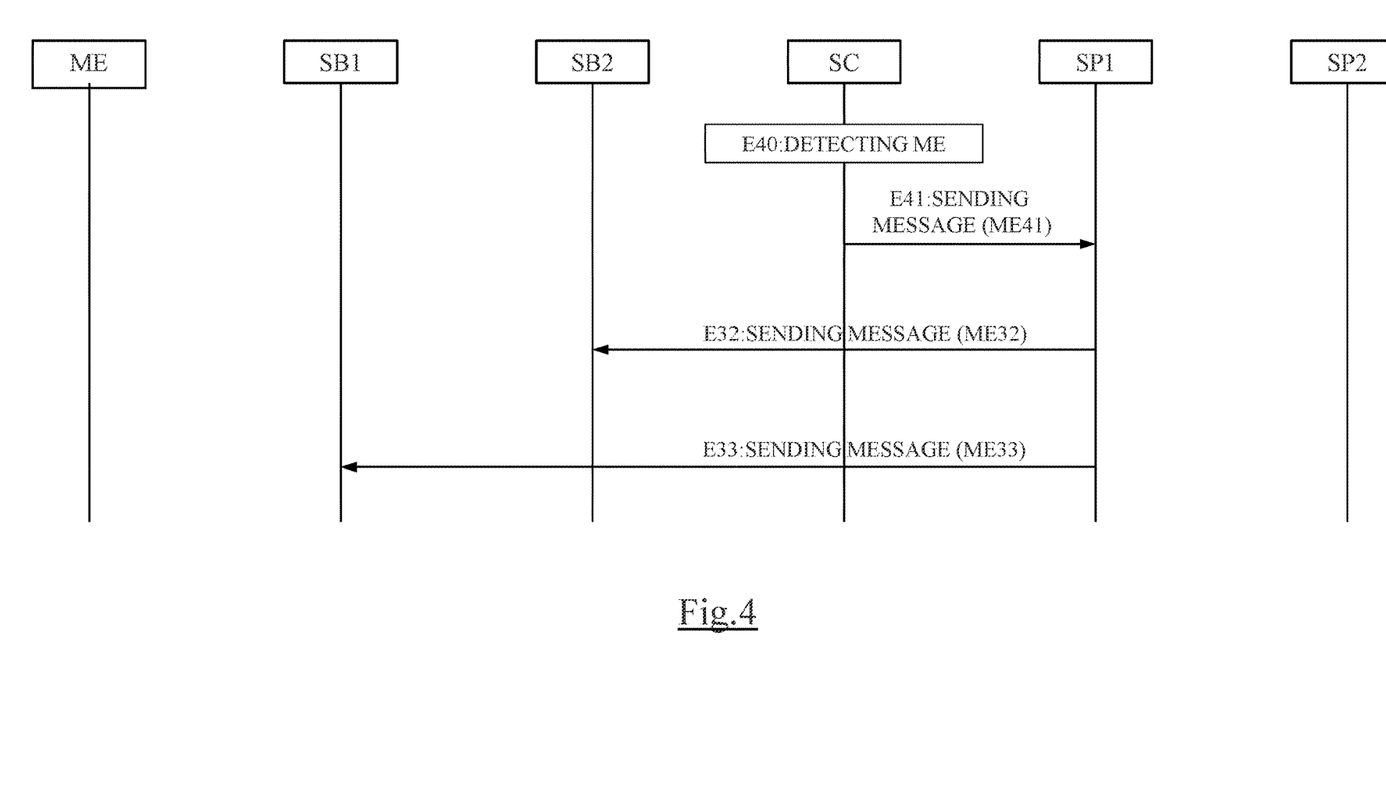
FIG. 4 represents steps of suspension of the sending of notification messages to the mobile equipment when the latter leaves the corresponding coverage zone, in a variant embodiment of the method according to the invention.

With reference to FIG. 4, additional steps E40 to E43 are provided in the variant embodiment of the invention in which the central server SC is interfaced with a location service of the mobile equipment ME.

In fact, in this variant embodiment, in order to save on radio resources, the central server SC releases the resources assigned to the mobile equipment ME in a peripheral server when the mobile equipment ME leaves the zone served by this peripheral server. These resources will of course be reassigned once again by a message sent by the central server SC to the peripheral server if the central server SC detects a return of the mobile equipment ME into the zone served by this peripheral server.

Thus, in the step E40, the central server SC detects the mobile equipment ME leaving the zone served by the peripheral server SP1.

The next step E41 is then the sending of a message ME41, by the central server SC, to the peripheral server SP1. This message ME41 signals that the mobile equipment ME has changed peripheral server of attachment.

On reception of the message ME41, the peripheral server SP1 sends messages ME42 in a step E42 to the base station SB2, and ME43 in a step E43 to the base station SB1, then erases from its memory the data assigned to the mobile equipment ME concerning the geo-service. These messages ME42 and ME43 are similar to the messages ME32 and ME33: they request the stopping of the notification by the "paging" channel to the mobile equipment ME of the types of events of interest to the mobile equipment ME. The base stations SB2 and SB1 thus release the radio and memory resources by erasing this notification request from their database.

In the variant in which the peripheral server SP1 is interfaced with a location service, the peripheral server SP1 sends a message requesting the stopping of the notification to the mobile equipment ME by the "paging" channel only to the base station under the coverage of which the mobile equipment ME was located.

It should be noted that, in the main variant embodiment, the resources assigned to the notification of events to the vehicle are definitively released in the peripheral servers and in the base stations in general only upon the deregistration of the vehicle from the geo-service.

Furthermore, other variant embodiments of the invention can of course be envisaged and can sometimes be combined. For example, as a variant, the central server SC is interfaced with a location service of the mobile equipment ME, but instead of having resources assigned for the mobile equipment ME in the different peripheral servers dynamically according to the position of the mobile equipment, it has these resources assigned once and for all, after the registration message ME11, in all the peripheral servers serving the region of interest of the mobile equipment ME, for example a programmed path. In this case, the registration message ME11 includes the region of interest ROI of the mobile equipment ME. In this variant or another variant, the peripheral servers are for example interfaced with a very accurate location service, allowing resources for the mobile equipment ME for the geo-service to be monopolized only in the base stations to which the mobile equipment ME is attached.

Finally, the notification message using the paging channel can be addressed to a single mobile equipment or a mobile equipment group (for example a group of vehicles having subscribed to the same geo-service). The identification associated with the notification channel and transmitted in this notification channel would then be a collective identifier. In this case, a single registration message would be sent to the central server for example via a fleet management server for this set of vehicles.

The invention claimed is:

1. A method for subscribing a mobile equipment to information on events of at least one type from a notification service linked to a location, the notification service being hosted in a peripheral server in an MEC architecture network, the method being implemented in the mobile equipment and comprising steps of:
    sending a registration request message requesting registration to a central server of the network,
    sending a subscription message for subscription, to the peripheral server, to the at least one type of event,
    receiving, from the peripheral server, a message giving information to the mobile equipment on an event of the at least one type,
    wherein
    the registration request message indicates the at least one type of event, and
    the step of sending a subscription message is based on reception of a notification message that an event of the at least one type has occurred in the location, the notification message is stored in the peripheral server and is delivered to the mobile equipment over a fast messaging channel called "paging" channel.

2. The method as claimed in claim 1, wherein the mobile equipment indicates in the subscription message a region of interest for which the peripheral server must send it the information on the events of at least one type.

3. The method as claimed in claim 2, wherein the mobile equipment is a communication module of a motor vehicle and wherein the region of interest corresponds to a programmed path of the vehicle.

4. The method as claimed in claim 1, wherein the step of reception of a notification message comprises decoding of a data field specific to such an event notification, the specific data field being included in a data field assigned to core network and present in a "paging record" field of the fast messaging channel.

5. A method for sending to a mobile equipment information on an event of a type by a peripheral server hosting a notification service linked to a location in an MEC architecture network, the method being implemented in the network and comprising steps of:
    sending, from the mobile equipment to a central server, a registration request message, the message comprising an indication of at least the type of event,
    sending, from the central server to the peripheral server hosting the notification service, a message indicating at least the type of event,
    verifying, by the peripheral server, presence of events of the type,
    when the at least one peripheral server includes an event of the type, sending, from the peripheral server through at least one base station to which it is attached for broadcasting, on a fast messaging channel called "paging" channel to the mobile equipment, a notification message notifying the presence of the type of event,
    server of sending a subscription message to the type of event, from the mobile equipment to the peripheral server,
    sending a message from the peripheral server to the mobile equipment, giving information on the event.

6. The method for sending a mobile equipment information on an event of a type by a peripheral server as claimed in claim 5, wherein the subscription message comprises a region of interest, and wherein the step of sending of a message giving information is performed when the event concerns the region of interest.

7. The method as claimed in claim 5, wherein, the message indicating at least the type of event is sent only to the peripheral servers hosting the notification service for which a network coverage corresponds to a current or programmed position of the mobile equipment.

8. The method as claimed in claim 7, wherein the peripheral server sends a message only to the base stations corresponding to the current or programmed position of the mobile equipment, for broadcasting, on the fast messaging channel, of the message notifying the presence of the event to the mobile equipment.

9. The method as claimed in claim 8, wherein the peripheral server sends the message to the at least one base station only if the event is associated with a zone covered by the at least one base station.

10. The method as claimed in claim 5, wherein the step of sending a message giving information to the mobile equipment is followed by a step of sending of a message by the peripheral server to the base station to which it is attached to stop the broadcasting on the fast messaging channel of the notification message when the event becomes obsolete or when the mobile equipment leaves a zone served by the peripheral server.

\* \* \* \* \*